United States Patent
Riemens et al.

(10) Patent No.: US 7,929,609 B2
(45) Date of Patent: Apr. 19, 2011

(54) MOTION ESTIMATION AND/OR COMPENSATION

(75) Inventors: Abraham Karel Riemens, Eindhoven (NL); Robert Jan Schutten, Cambell, CA (US); Jeroen Maria Kettenis, Hamburg (DE); Olukayode Anthony Ojo, Eindhoven (NL); Kornelis Antonius Vissers, Sunnyvale, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1242 days.

(21) Appl. No.: 10/237,814

(22) Filed: Sep. 9, 2002

(65) Prior Publication Data

US 2003/0063673 A1 Apr. 3, 2003

(30) Foreign Application Priority Data

Sep. 12, 2001 (EP) .................................. 01203440

(51) Int. Cl.
*H04N 7/12* (2006.01)
*H04N 7/32* (2006.01)
(52) U.S. Cl. ................... 375/240.16; 348/699
(58) Field of Classification Search .................. 348/699, 348/407, 412, 413, 416, 208.4, 409, 402, 348/700; 372/240.16, 240.14, 240.11, 240.06, 372/240.15; 382/236, 238, 260, 232, 276, 382/103; 375/240.08, 240.03, 240.13, 240.17, 375/240.16, 240.12, 240.24, 240.01, 240.15
See application file for complete search history.

(56) References Cited

U.S. PATENT DOCUMENTS

| | | | | |
|---|---|---|---|---|
| 5,212,548 A | * | 5/1993 | de Haan et al. | 348/416.1 |
| 5,473,379 A | * | 12/1995 | Horne | 375/240.16 |
| 5,657,087 A | * | 8/1997 | Jeong et al. | 348/416 |
| 6,078,618 A | | 6/2000 | Yokoyama et al. | |
| 6,128,047 A | * | 10/2000 | Chang et al. | 348/699 |
| 6,182,069 B1 | * | 1/2001 | Niblack et al. | 707/6 |
| 6,249,612 B1 | * | 6/2001 | Ogura | 382/236 |
| 6,285,711 B1 | * | 9/2001 | Ratakonda et al. | 375/240.16 |
| 6,574,370 B1 | | 6/2003 | Kazayama et al. | |
| 6,707,854 B1 | * | 3/2004 | Bonnet et al. | 375/240.16 |
| 6,778,605 B1 | * | 8/2004 | Hamanaka | 375/240.16 |
| 6,876,702 B1 | * | 4/2005 | Hui et al. | 375/240.16 |
| 7,010,045 B2 | * | 3/2006 | Lee | 375/240.25 |
| 7,551,673 B1 | * | 6/2009 | Oh et al. | 375/240.16 |
| 2001/0002922 A1 | * | 6/2001 | Hayashi | 375/240.16 |
| 2002/0114394 A1 | * | 8/2002 | Ma | 375/240.16 |
| 2005/0207663 A1 | * | 9/2005 | Zeng et al. | 382/236 |

FOREIGN PATENT DOCUMENTS

EP 0866619 3/1998

(Continued)

OTHER PUBLICATIONS

Isaeil et al: "Efficient motion estimation using spatial and temporal motion vector prediction" Image Processing, 1999. ICIP 99. Proceedings. 1999 International Conference On Kobe, Japan, Oct. 24, 1999, pp. 70-74.

(Continued)

*Primary Examiner* — Behrooz Senfi
(74) *Attorney, Agent, or Firm* — DLA Piper LLP (US)

(57) ABSTRACT

Estimating and/or compensating motion in a video image is provided wherein an image segment of the video image is selected, a search area is defined around the image segment, the defining being based on a range of possible motion vectors for the image segment, and image data related to said search area is retrieved. The search area is defined to have its center offset from a center of the image segment. The offset may be determined by a global motion parameter.

13 Claims, 3 Drawing Sheets

FOREIGN PATENT DOCUMENTS

Figure 1:
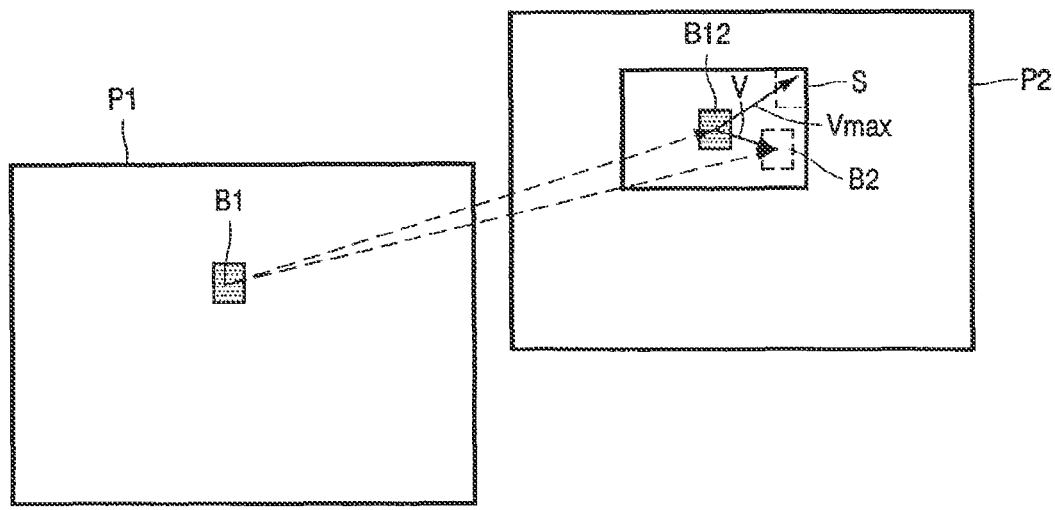

| | | |
|---|---|---|
| EP | 0982952 | 8/1999 |
| EP | 1198140 | 4/2001 |
| JP | 5-328333 | 12/1993 |
| JP | H05-328333 | 12/1993 |
| JP | 10-262258 | 3/1997 |
| JP | 10-336666 | 12/1998 |
| JP | 11-112940 | 4/1999 |
| JP | 2001-103429 | 4/2001 |
| WO | WO00/05899 | 3/2000 |

OTHER PUBLICATIONS

Choon-Hoon et al: "A new block-matching algorithm based on an adaptive search area adjustment using spatio-temporal correlation" Consumer Electronics, 1999. ICCE. Jun. 22, 1999, pp. 362-363.

Von Dr.-Ing. Habil Christian Hentschel, "Video-Signalverabeitung," Philips Research Laboratories, Eindoven•(Niederlande), B.G. Teubner Stuttgart 1998, pp. 213-217.

G.de Haan et al.: "True-motion Estimation with 3D Recursive Search block Matching", vol. 3, No. 5, Oct. 1993.

G. de Haan: "IC for Motion-compensated DE-interfacing, Noise Reduction and Picture-rate convension", vol. 45, No. 3, Aug. 1999.

Herve Benoit: "Digital Television, MPEG-1, MPEG-2 and principles of the DVB system", London 1997, pp. 40-42.

Migliorati P. et al.: "Multistage motion estimation for image interpolation", pp. 187-199, Sep. 1, 1995.

Renxiang Li et al.: "A robust and fast block motion estimation algorithm", pp. 373-376, 1994.

* cited by examiner

MOTION ESTIMATION AND/OR COMPENSATION

The present invention relates to a method for compensation and/or estimation of motion in video images.

Hervé Benoit: "Digital Television, MPEG-1, MPEG-2 and principles of the DVB system", London, 1997, pages 40-42 discloses that P and B pictures are predicted from preceding and/or subsequent pictures by using motion estimation. Motion estimation consists of defining a motion vector which ensures the correlation between an 'arrival' zone on a second picture and a 'departure' zone on a first picture, using a technique known as block matching. This is done at macroblock level (16×16 pixels) by moving a macroblock of the current picture within a small search window from the previous picture, and comparing it to all possible macroblocks of the window in order to find the one that is most similar. The difference (or prediction error) between the actual block to be encoded and the matching block is calculated, and encoded in a similar way to the blocks of the I pictures. This process is called motion compensation.

Another application of motion estimation and/or compensation is video scan rate conversion, where the output image rate of a video signal processing system differs from the input image rate. Also this type of application benefits from the use of motion vectors, as described by Gerard de Haan et al in "True-motion Estimation with 3-D Recursive Search block Matching, IEEE Transactions on Circuits and Systems for Video Technology, Vol. 3, No. 5, October 1993, and by Gerard de Haan in "IC for Motion-compensated De-interlacing, Noise Reduction and Picture-rate conversion", IEEE Transactions on Consumer Electronics, Vol. 45, No. 3, August 1999.

For such encoding or scan rate conversion methods as well as other practical applications of motion estimation and/or motion compensation the determination of motion vectors is usually based on block matching, by which for a selected generally square block of pixels, typically containing 16×16 or 8×8 pixels, of an encoded image a surrounding sub-area is defined with the pixel block positioned in its centre and typically containing e.g. 88×40 pixels. This sub-area is applied as a search area or window around the pixel block at the same spatial position of a preceding image for searching a pixel block located within the search area or window having a video signal information matching that of the selected pixel block. See also Hentschel, 'Video-Signalverarbeitung', B. G. Teubner Stuttgart 1998, pages 214-217.

In present systems, image data of this search area or window is usually stored in a local buffer or on-chip memory to which rather extreme bandwidth requirements are made.

The search area relates to the area that includes all possible locations of the image segment (e.g. a macroblock) moved over the motion vector ranges possible for that image segment. Therefore, there is a direct relationship between the size of the search area and the motion vector ranges. A larger search area usually improves the motion estimation and/or compensation. However, a larger search area requires more resources especially in amount of buffer memory, which relates to silicon area. This results in a tradeoff between the quality and the implementation costs.

It is an object of the present invention to provide an improved motion estimation and/or compensation.

To this end, the invention provides motion estimating and/or compensating, encoding, an encoded digital video signal, a storage product, a distribution system and a reproduction apparatus as defined in the independent claims. Advantageous embodiments are defined in the dependent claims.

According to a first aspect of the invention, the search area is defined to have its center offset from a center of the image segment. By introducing an offset, the search area can be defined in a favorable position. For example, if motion is expected in a given direction, the search window may be defined having an offset in the same direction resulting in larger motion vector ranges being possible in the direction of the expected motion. In fact, the search window is enlarged in a favorable direction at the cost of a reduction of the search area in the opposite direction. By offsetting the center of the search area or window from the center of the image segment actually being processed (the selected image segment) such as an 8×8 pixel block, the location of the local search area or window will become asymmetric relative to the image segment. Instead of (global) motion, other image characteristics may also be used to define an offset for the search area. This aspect of the invention is especially advantageous in applications wherein image data related to the search area is retrieved from an image memory, which image data is temporarily stored in a buffer memory.

In a practical embodiment, the offset is in a horizontal direction of the video image only. This is advantageous because in video, motion in horizontal direction is most common.

In a practical embodiment, the offset is determined by a global motion parameter. This parameter may be extracted from global motion within a sequence of images or may be locally adapted to motion properties in a part of the image. The maximum range of the motion vectors in the direction of the global motion will increase and a compensation of the global motion will be provided.

Motion estimation and/or compensation according to embodiments of the invention may be applied to all digital video signal processing functions involving the use of motion estimation and/or motion compensation such as motion compensated prediction in encoding/compressing of digital video signals, motion compensated filtering in noise reduction, motion compensated interpolation in video format conversion, motion compensated de-interlacing of interlaced video signals etc.

Figure 2:
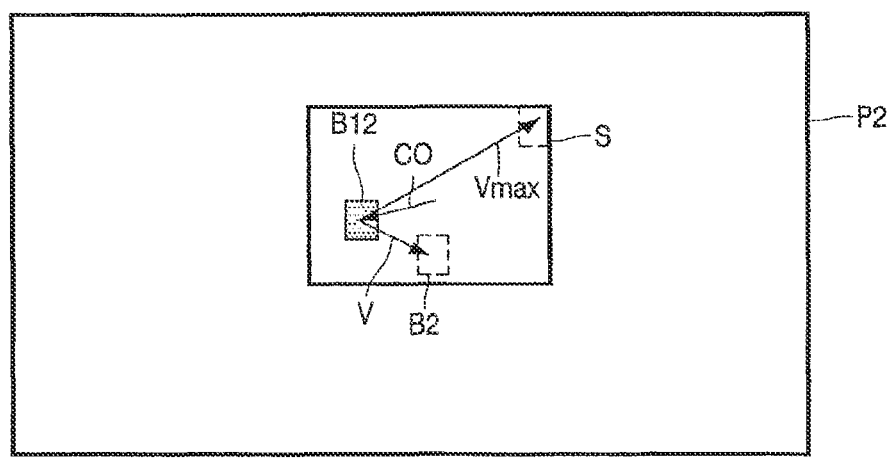
Figure 3:
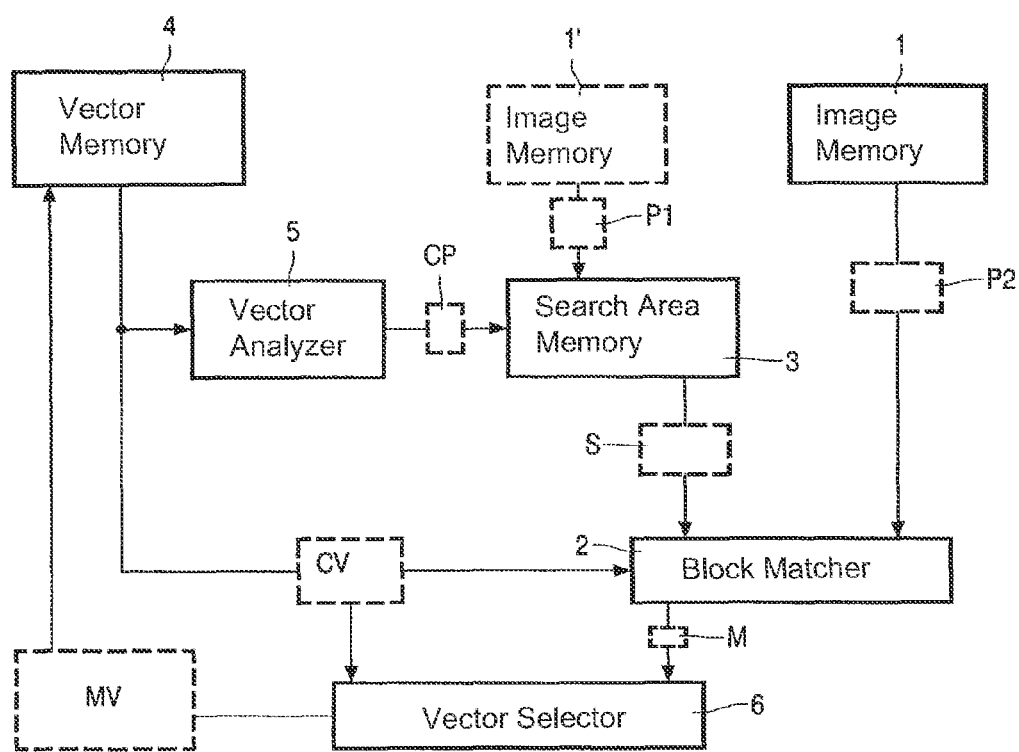
Figure 4:
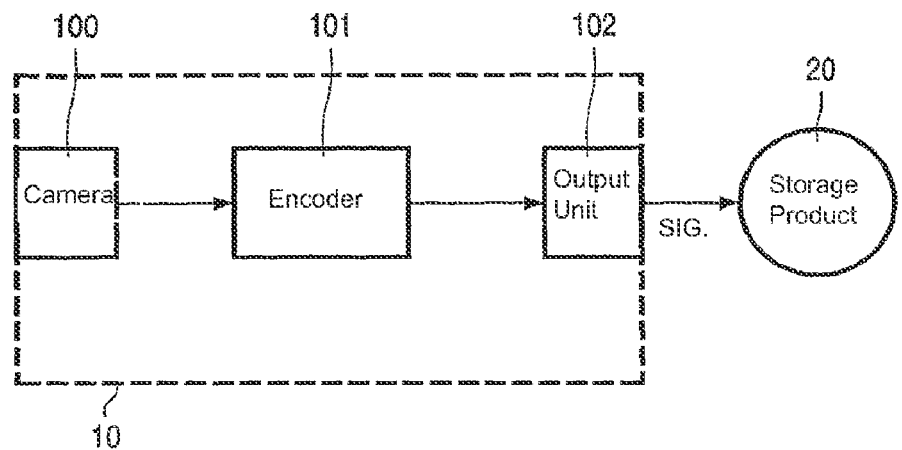
Figure 5:
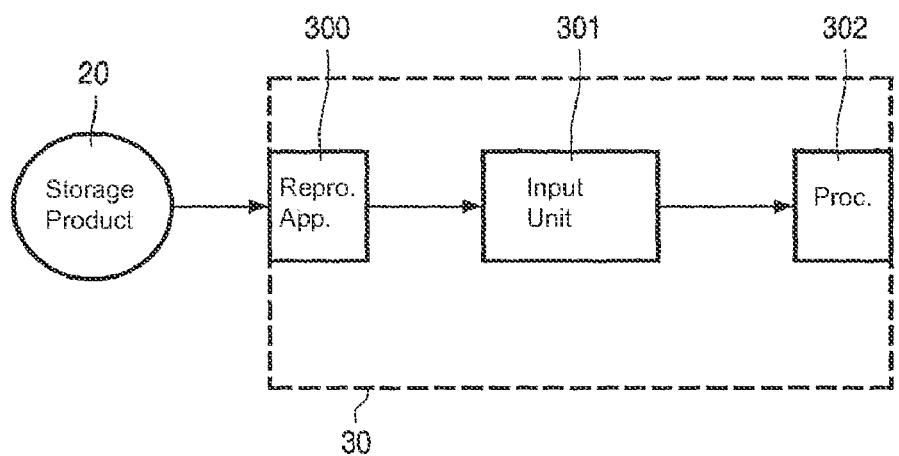

In the following the invention will be explained in further detail with reference to the accompanying drawings, wherein FIG. 1 illustrates a search area with vector limitations as known in the prior art, FIG. 2 illustrates a search area with compensation for global motion in accordance with an embodiment of the present invention, FIG. 3 is a simplified block diagram of a possible motion estimator architecture according to an embodiment of the invention for use, e.g. in video scan rate conversion, FIG. 4 shows a distribution system according to an embodiment of the invention, and FIG. 5 shows a reproduction apparatus according to an embodiment of the invention.

In FIG. 1 an example is given of the application of a motion vector V to interpolation of an image in a sequence of consecutive video images on the basis of a preceding image of the sequence. Such interpolation is typically used in video scan rate conversion, e.g. from 50 Hz in to 100 Hz image format.

Each motion vector V describes a difference in position between an image segment B1 in a first image P1 and a matching image segment B2 in a second image P2. In one-directional prediction the second image P2 is usually a previous image, although the second image P2 may also be a subsequent image. According to this description, a motion vector is defined in a two-dimensional plane and has an X component and an Y component.

In practical embodiments, the image segments B1 and B2 are blocks, e.g. of 8×8 pixels. The motion vector determination is based on a so-called block matching technique as known in the art. In the second image P2, a selected block B12 is defined corresponding with the selected block B1 in the first image P1. A search area S is defined around the block B12 depending on the ranges of the motion vectors possible for B1/B12. Typically, the search area S may comprise a number of pixel blocks surrounding the pixel block B12 in the horizontal and vertical directions and for a block of 8×8 pixels the size of the search area S may be e.g. 88×40 pixels. The motion vector V to be assigned to the block B1/B12 is determined by searching the search area or window S for the block B2 best matching the pixel block B1.

By use of the block matching technique this searching process can be conducted with a varying level of complexity depending to some extent on the actual application of motion estimation, but involves typical selection of a best vector from a set of so-called candidate vectors stored in a prediction memory. Details of the searching process is not explained here, but a comprehensive analysis of various options is given in Gerard de Haan et al: "True-motion Estimation with 3-D Recursive Search Block Matching", IEEE transactions on Circuits and Systems for Video Technology, Vol.3, No. 5, October 1993 and Gerard de Haan: "IC for Motion-compensated De-interlacing, Noise Reduction and Picture-rate conversion", IEEE Transactions on Consumer Electronics, Vol. 45, No. 3, August 1999, as mentioned before.

In this way motion vectors may be determined for all blocks of the image P1. The motion vectors may be used to interpolate images to obtain in the desired video format conversion.

The maximum range of the motion vector V relates to the size of the search area or window S and with the actual pixel block centered in the search area or window the maximum range of horizontal and vertical components of the maximum motion vector V will, in the illustrated example be 40 and 16 pixels in horizontal and vertical direction, respectively, corresponding to 8 and 5 pixel blocks, respectively.

FIG. 2 illustrates motion estimation and/or motion compensation according to an embodiment of the present invention, wherein the search area or window S assigned to the pixel block B12 in the image P2 is defined to have its center offset from the position of the pixel block B12 by an offset CO. The offset is advantageously determined by a global motion parameter, which is extracted e.g. from global motion in the sequence of images including the image under processing as may be caused typically by camera movement in the form of panning or tilting. Thereby, the search area or window S will be asymmetrically positioned with respect to the block B12 and the maximum range for determination of the motion vector may be extended in one horizontal direction and/or one vertical direction. In the example illustrated in FIG. 2 the center offset CO for the search area or window S amounts to 10 pixels in the horizontal direction and 8 pixels in the vertical direction resulting in a maximum range of 50 pixels in the horizontal direction (to the right) and 24 pixels in the vertical direction (to the top).

In a simple implementation of the asymmetric displacement of the search area or window S with respect to the block B12 the global motion parameter determining the center offset CO may be determined from the average vector of the motion vectors established for one or more previous images.

In more advanced systems statistics of previously calculated vector fields may be used for calculation of maximum vector values to determine the center offset CO.

In the simplified block diagram in FIG. 3 of a possible motion estimator architecture for use e.g. in video scan rate conversion, incoming images are supplied to an image memory 1, from which the actual image pair P1 and P2 comprising groups of image segments for which motion vectors are to be determined, is transferred to a block matcher 2. In the block matcher 2 a search for image segment groups or blocks in the image P2 matching selected image blocks in the image P1 is conducted by application of a search area S transferred to the block-matcher 2 from a local buffer or search area memory 3 and by use of a set of candidate motion vectors CV transferred to the block matcher 2 from a vector memory 4.

The search area S temporarily stored in the buffer memory 3 is obtained from the image P2, which has been stored in image memory 1'. The image memories 1 and 1' may be implemented in one image memory.

The vector memory 4 stores all motion vectors determined for segment groups or blocks of the second image P2 and an image block to be searched in the image P1 the set of candidate vectors may typically comprise motion vectors determined for an image block with same location in the preceding image or an adjacent image block in the actual image.

According to the invention an enlargement of the range of motion vectors possible for a given size of the search area S is made possible by modification of the definition of the search area to have its center offset from the position in the image of the segment group or block under investigation.

In a simple implementation this modification may be conducted as illustrated by determination of a motion compensation parameter CP by analysis of previously found vectors from the vector memory 4 in a vector analyzer 5.

The block matching process conducted in block matcher 2 is known in the art and involves comparison or matching of blocks localized by application of the candidate vectors.

Through this process each match error M is passed to a vector selector 6 which selects the best match and stores the corresponding candidate vector in the vector memory 4 for use in the determination of future motion vectors.

The simple motion estimator architecture illustrated in FIG. 3 is only one example of implementation of the invention. As an alternative possibility motion compensation parameters from previously processed image blocks or preceding images could be stored in a global motion estimation memory, from which a motion compensation parameter for actual use could be retracted by appropriate selection means.

FIG. 4 shows a distribution system 10 according to an embodiment of the invention. The distribution system 10 comprises means 100 for obtaining a sequence of video images. The means 100 may be a camera, but also an input unit such as an antenna for receiving a signal carrying the sequence of video images. The means 100 may further be a reading unit for a record carrier. The distribution system further comprises an encoder 101 for encoding the sequence of video images to obtain an encoded digital video signal Sig. The encoder 101 comprises a motion estimation and/or compensation device which uses an asymmetric search area, e.g. the device of FIG. 3. The distribution system 10 further comprises an output unit 102 for outputting the encoded video signal Sig, e.g. by storing the signal Sig on a storage product 20. Preferably, the output unit 102 incorporates a representation of the offset of the asymmetric search area as prediction information in the encoded video signal Sig. The offset may be explicitly included in the signal, but may also be implicitly included in the motion vector ranges.

FIG. 5 shows a reproduction apparatus 300 such as a television or digital receiver according to an embodiment of the invention. The reproduction apparatus 300 comprises an input unit 301 to obtain an encoded digital video signal comprising a sequence of encoded video images. The input unit 301 may be similar to the input unit 101 of the distribution system suitably arranged to receive encoded video images. The sequence of encoded video images may be obtained from a storage product 20'. The reproduction apparatus 30 further comprises a processor 302 performing inter alia motion compensating and/or estimating using an asymmetric search area. Thereto the processor 302 may comprise a device as given in FIG. 3. An output unit 303 (e.g. a display) outputs the processed video images. The processing performed in the device 302 may be a scan rate conversion performing motion estimation and/or motion compensation with an asymmetric search area. In the case the reproduction apparatus is processing the signal Sig obtained from the distribution system 10 of FIG. 4, the search area may be determined by the motion vector information included in the signal Sig.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of estimating and/or compensating motion in video images, the method comprising:
using a video processor to select an image segment of a given video image;
using the video processor to define an asymmetric search area surrounding the image segment based on ranges of possible motion vectors for the image segment; and
using the video processor to retrieve image data related to said asymmetric search area
wherein to the video processor defines the asymmetric search area to have a center offset from a center of the image segment, the offset thereby defining asymmetry of said asymmetric search area, and statistically determined from an average vector of motion vectors established for one or more previous images.

2. A method of estimating and/or compensating motion in video images, the method comprising:
using a video processor to select an image segment of a given video image;
using the video processor to define an asymmetric search area surrounding the image segment based on ranges of possible motion vectors for the image segment; and
using the video processor to retrieve image data related to said asymmetric search area, wherein the video processor defines the asymmetric search area to have a center offset from a center of the image segment, wherein the center offset is determined by a global motion parameter statistically determined from an average vector of motion vectors established for at least one preceding video image.

3. A method as claimed in claim 2, further comprising:
using the video processor to determine minimum and maximum values of motion vectors in said motion vector field.

4. A method as claimed in claim 2, further comprising:
using the video processor to determine an average value of motion vectors in said motion vector field.

5. A device for estimating and/or compensating motion in video images, the device comprising:
means for selecting an image segment of a given video image;
means for defining an asymmetric search area surrounding the image segment, the defining being based on ranges of possible motion vectors for the image segment; and
means for retrieving image data related to said asymmetric search area, wherein the asymmetric search area is defined to have its center offset from a center of the image segment, thereby defining asymmetry of said asymmetric search area, and statistically determined from an average vector of motion vectors established for one or more previous images.

6. The method of claim 2, wherein said global motion parameter is a parameter pertaining to global motion caused by camera movement.

7. The method of claim 6, wherein said motion vector field is a motion vector field of merely one preceding video image.

8. The method of claim 3, wherein said global motion parameter is a parameter pertaining to global motion caused by camera movement.

9. The method of claim 8, wherein said motion vector field is a motion vector field of merely one preceding video image.

10. The method of claim 4, wherein said global motion parameter is a parameter pertaining to global motion caused by camera movement.

11. The method of claim 10, wherein said motion vector field is a motion vector field of merely one preceding video image.

12. The device of claim 5, further comprising:
means for determining minimum and maximum values of the motion vectors.

13. The device of claim 5, further comprising:
means for determining an average value of the motion vectors.

* * * * *